(12) United States Patent
Takata

(10) Patent No.: US 6,644,752 B2
(45) Date of Patent: Nov. 11, 2003

(54) FOLDING SEAT HAVING A BELT MEMBER

(75) Inventor: Yasuhide Takata, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/904,474

(22) Filed: Jul. 13, 2001

(65) Prior Publication Data
US 2002/0033630 A1 Mar. 21, 2002

(30) Foreign Application Priority Data

Feb. 8, 2000 (JP) ........................................ 2000-234868

(51) Int. Cl.[7] ................................................. A47C 7/02
(52) U.S. Cl. .............................. 297/452.56; 297/284.1; 297/284.2; 297/452.59
(58) Field of Search ...................... 297/284.1, 452.56, 297/284.2, 452.59, 440.11, 440.2, 440.22

(56) References Cited

U.S. PATENT DOCUMENTS

| | | | | | |
|---|---|---|---|---|---|
| 2,865,436 A | * | 12/1958 | Thorne | ................... | 297/440.11 |
| 3,154,345 A | * | 10/1964 | Lambrecht | ............. | 297/188.09 |
| 4,332,419 A | * | 6/1982 | Vogel | ...................... | 297/440.2 |
| 4,492,408 A | * | 1/1985 | Lohr | .......................... | 248/424 |
| 4,538,783 A | * | 9/1985 | Stobbe | ....................... | 211/104 |
| 4,545,614 A | * | 10/1985 | Abu-Isa et al. | .......... | 297/284.2 |
| 4,702,522 A | * | 10/1987 | Vail et al. | ................. | 297/284.2 |
| 4,848,843 A | * | 7/1989 | Gibbs | ......................... | 248/188 |
| 4,883,320 A | * | 11/1989 | Izumida et al. | .......... | 297/284.1 |
| 5,378,040 A | * | 1/1995 | Chaney et al. | .............. | 297/338 |
| 5,439,271 A | * | 8/1995 | Ryan | ....................... | 297/218.5 |
| 6,231,125 B1 | * | 5/2001 | Maeda et al. | .......... | 297/452.55 |
| 6,302,487 B1 | * | 10/2001 | Fujita et al. | ............ | 297/452.56 |
| 6,315,364 B1 | * | 11/2001 | Fujita et al. | ............ | 297/452.56 |
| 6,361,117 B1 | * | 3/2002 | Tate | ....................... | 297/452.56 |
| 6,378,949 B1 | * | 4/2002 | Maeda et al. | .......... | 297/452.56 |

FOREIGN PATENT DOCUMENTS

JP          04274936 A    *    9/1992    ............ B60N/2/02

* cited by examiner

Primary Examiner—Peter M. Cuomo
Assistant Examiner—Stephanie Harris
(74) Attorney, Agent, or Firm—Steinberg & Raskin, P.C.

(57) ABSTRACT

A seat member 10 of the present invention is provided with a belt member 200 in the back side of each cushioning member, in which the belt member is held by engaging with an appropriate portion of a back frame 30 at its one end and with an appropriate portion of a seat frame 40 at the other end, is disposed in the vicinity of, at least, either right or left side of a sitting person in a direction along the longitudinal cross-section, and is designed to have the length in the overlapping area with the above-described cushioning members shorter than the length along an expanded state of the cushioning members in the same area and is designed to be made of a material having a higher stiffness than those of respective cushioning members. By disposing the belt member 200, when a person takes a seat, it becomes possible to support the waist of sitting person since a portion corresponding to the belt member is relatively bulged out. In addition, since a relatively bulged position of the place corresponding to the belt member differs in response to the physique (weight, etc.) of the sitting person, the waist-supporting function can be exhibited in response to difference in the physique so that the feeling of seating can be improved.

9 Claims, 14 Drawing Sheets

FOLDING SEAT HAVING A BELT MEMBER

BACKGROUND OF THE INVENTION

The present invention relates to a seat used as, for example, a seat of a car.

In a seat used for a seat of a car and the like, in order to support the waist of a person who sits on the seat, bulging portions to bulge out forward are provided in the width direction on both sides of a seat back to form a recess in the center thereof, and a lumbar supporting portion is also provided which juts out around the lower portion of the recess slightly in front. The provision of these bulging portions and lumbar supporting portion enables the body on the seat to be held securely, to support the haunches and waist of a person sitting on the seat to prevent from leaning and shifting of the body during driving, and to prevent generation of an oppressive feeling of the abdomen and generation of a backache.

However, the waist-support by a conventional seat depends largely on the shape and size of a seat back as described above, and it is not possible to exhibit an appropriate waist-supporting function in response to difference in the physique. Accordingly, there may be cases where the waist-supporting function of a seat is not sufficient for a certain difference in the physique. There are some seats of which waist-supporting forces are made adjustable by supplying or exhausting air, but they have complicated structures and are expensive.

In a seat for plural persons, places corresponding to the positions between sitting persons are formed to bulge out in front for the seat back, and bulge out upward for a seat cushion. For this purpose, frame members are disposed on these border places between sitting persons in the back side of cushion members. The provision of the bulging portions has an advantage that a portion from the haunches to the waist can be held securely for any persons sitting on the seat, preventing from leaning and shifting of the body during driving, thereby preventing generation of a backache. However, it has a complicated structure and too much weight, which leads to a cost increase.

In order to make a baggage space in a car wider, a folding seat which has a structure of putting a seat back on a seat cushion in layer by pushing down the seat back in front has been known. However, if such a folding seat has a seat back structure provided with the above-described bulging portions, the total thickness of the seat back and the seat cushion when being folded is large so that the seat occupies too much space in the baggage space. In a seat for plural persons, since border frames are provided on the portions corresponding to the places between respective sitting persons as described above, if the seat is required to be a folding seat, the structure becomes much more complicated.

SUMMARY OF THE INVENTION

The present invention is carried out in view of the above-described circumstances, and its object is to provide a seat which enables to exhibit a waist-supporting function in response to difference in the physique, to improve the feeling of seating, and to manufacture it with a simple structure and at low cost.

Another object of the present invention is to provide a seat for a plural persons, which does not require to dispose a frame on a portion corresponding to a place between each sitting person, exhibits a waist-supporting function in response to difference in the physique to improve the feeling of seating, and enables to manufacture at low cost.

Still another object of the present invention is to provide a seat which has a structure capable of exhibiting the waist-supporting function in response to difference in the physique, but still enables to make the total thickness of the seat cushion and the seat back in a folded state thinner than the conventional folding seat so that its baggage space can be widened, and to which the present invention is applicable even for plural persons with a simple structure.

In accordance with one aspect of the present invention, a seat comprising: a seat cushion having a cushioning member supported by a seat frame; a seat back having a cushioning member supported by a back frame; and a belt member provided in the back side of each cushioning member, the belt member being held on an appropriate portion of the back frame at one end thereof and on an appropriate portion of the seat frame at the other end, disposed in the vicinity of, at least, either right or left side of a sitting person in a direction along the longitudinal cross-section, being designed to have the length in the overlapping area with the above-described cushioning members shorter than the length along an expanded state of the cushioning members in the same area and being designed to be made of a material having a higher stiffness than those of respective cushioning members.

A preferred embodiment of the present invention provides a seat in which one end of the belt member is held by engaging with an upper end frame of the back frame and the other end of the belt member is held by engaging with a front end frame of the seat frame.

A preferred embodiment of the present invention provides a seat in which a covering member is fixed on the back face of each cushioning member to form a substantially cylindrical shape with the back face, and the belt member is inserted in a hollow portion formed by the covering member.

A preferred embodiment of the present invention provides a folding seat in which each cushioning member is made of a net member in a three-dimensional structure in which a front mesh layer and a back mesh layer are connected with a large number of piles.

A preferred embodiment of the present invention provides a seat in which each cushioning member made of the net member in a three-dimensional structure has a one-piece structure united integrally with two cushioning members.

A preferred embodiment of the present invention provides a seat in which the belt members are disposed in the vicinity of both right and left sides of a sitting person.

A preferred embodiment of the present invention provides a seat in which the seat cushion and seat back are formed for plural persons, and the belt member is provided on a portion corresponding to a place between sitting persons.

A preferred embodiment of the present invention provides a seat in which the belt member has a restoration property.

A preferred embodiment of the present invention provides a seat in which a distance between the inner sides of the respective side frames composing the seat frame is arranged to be wider than a distance between the outer sides of the respective side frames composing the back frame, and when the seat is folded, it can be folded in a manner that the respective side frames of the back frame are surrounded by the respective side frames of the seat frame so that the respective side frames of the back frame are positioned in the inside of the respective side frames of the seat frame.

DETAILED DESCRIPTION OF THE PREFERRED EMBODIMENTS

Figure 1:
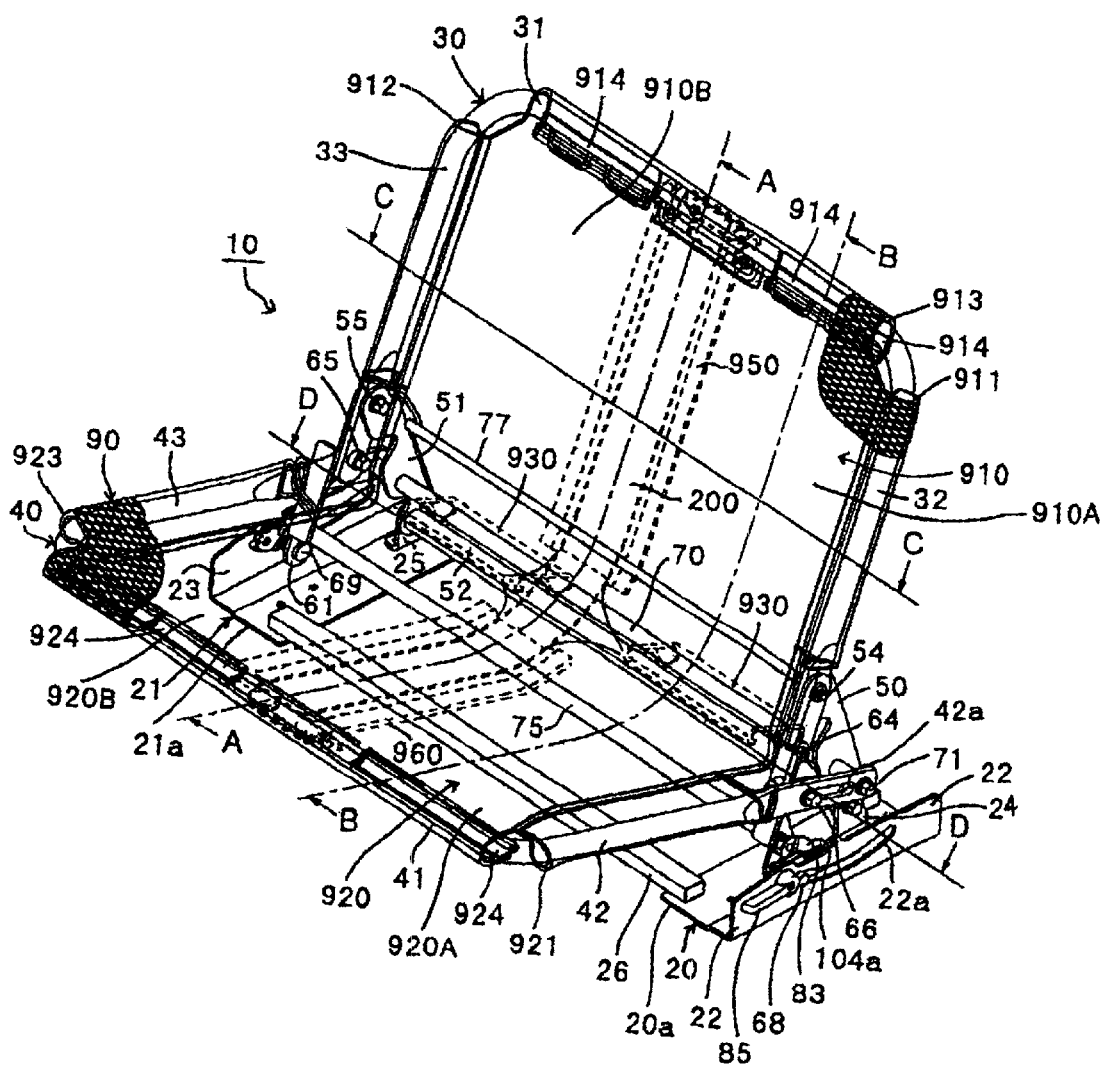
FIG. 1 is a perspective view showing a state of a folding seat according to an embodiment of the present invention when it is in use.
Figure 7:
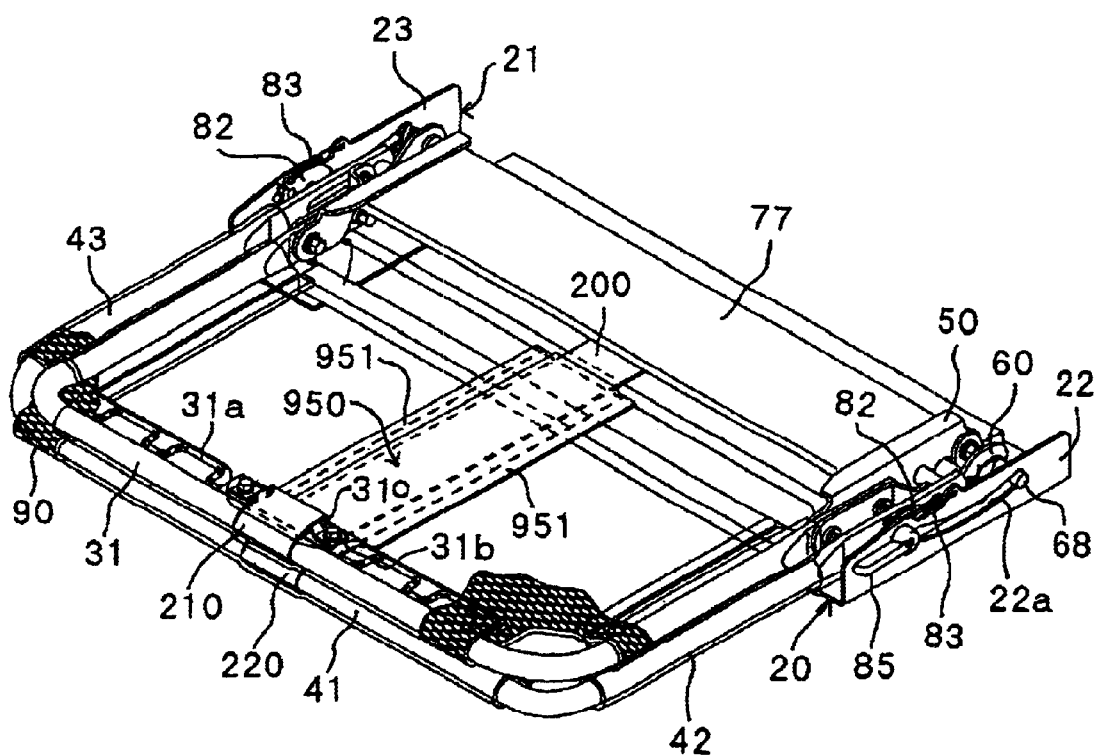
FIG. 7 is a perspective view showing a state of the folding seat relating to the above embodiment when it is folded.
Figure 8:
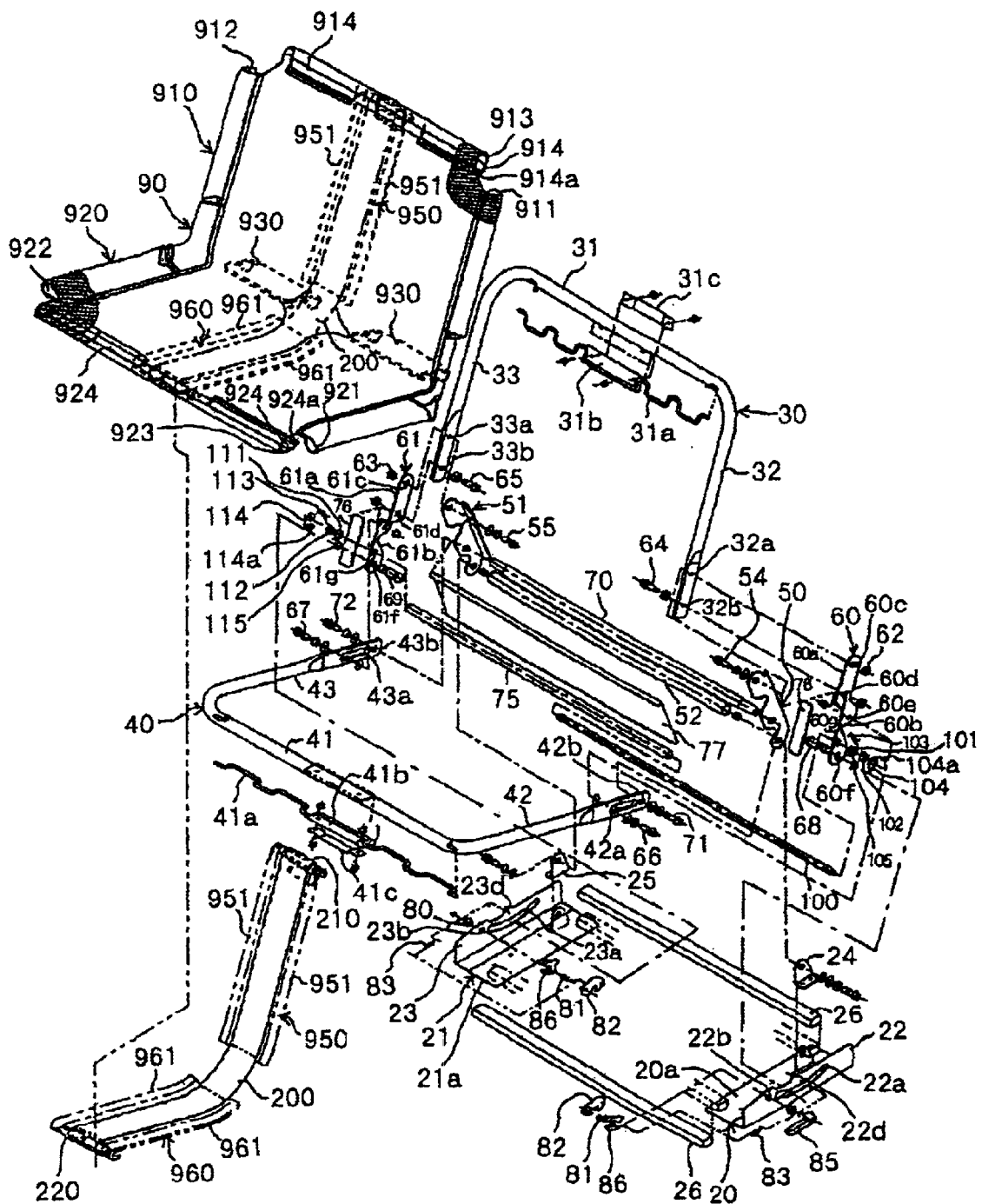
FIG. 8 is an exploded perspective view of the folding seat relating to the above embodiment.

The present invention will be explained in more detail according to embodiments shown in the drawings. The embodiment shown in the drawings is that the present invention is applied to a folding seat, and FIG. 1 is a perspective view showing a state of the folding seat 10 relating to the present embodiment when it is in use, and FIG. 7 is a perspective view showing a state of the folding seat when it is folded. FIG. 8 is an exploded perspective view of the folding seat. As shown in these drawings, the folding seat 10 of this embodiment comprises base plates 20 and 21, a back frame 30, a seat frame 40 and a net member 90 as a cushioning member.

The base plates 20 and 21 comprises: the bases 20a and 21a which are disposed at a predetermined space with each other in a width direction by a space-holding frame 26; and side plates 22 and 23 which are disposed facing each other at a predetermined space between thereof by bending upward from the outside of side edges of the bases 20a and 21a. The bases 20a and 21a are fixed or supported to be slidable back and forth on a car floor, if it is used, for instance, in a car. Brackets 24 and 25 are fixed near the rear ends of the bases 20a and 21a respectively. Long holes 22a and 23a each having substantially an arc shape when seen from the side (hereinafter, referred to as "arc-shaped long holes") are bored in the side plates 22 and 23.

The back frame 30 is formed substantially in the shape of the letter U, and has an upper end frame 31 and a pair of side frames 32 and 33 extending from both ends of the upper end frame 31 and facing each other. Four through-holes 32a, 32b, 33a, and 33b, two through-holes each are bored at a predetermined space in the longitudinal direction of each of the side frames 32 and 33 near lower ends of the side frames 32 and 33 (ends on the lower side when the seat is used).

The seat frame 40 is formed substantially in the shape of the letter U similar to the back frame 30, and has a front end frame 41 and a pair of side frames 42 and 43 extending from both ends of the front end frame 41, and facing each other. Long holes 42a and 43a each having a predetermined length are bored near the rear ends of the side frames 42 and 43 (ends near the seat back when in use). Through-holes 42b and 43b are bored between the long holes 42a and 43a, and the rear ends of the side frames 42 and 43 respectively. The space between the side frames 42 and 43 composing the seat frame 40 is made wider than the space between the side frames 32 and 33 composing the back frame 30. The seat 10 relating to the present embodiment is used for two persons; and both the space between the side frames 42 and 43 composing the seat frame 40, and the space between the side frames 32 and 33 composing the back frame 30 are formed to have a size for two persons to be able to sit.

Respective lower ends of connection plates 50 and 51 are pivotably fixed to the respective brackets 24 and 25 provided on the above-described base plate 20 through a pipe member 52 which is laid across both members. The upper ends of the connection plates 50 and 51 are pivotably fixed into the upper side through-holes 32a and 33a formed in respective side frames 32 and 33 of the back frame 30 with shaft members 54 and 55.

The shaft members 54 and 55 are inserted through into the through-holes 32a and 33a from inside in a state that the connection plates 50 and 51 are positioned in the inside of the respective side frames 32 and 33 of the back frame 30 as shown in FIG. 8. Linkage plates 60 and 61 are disposed on the opposite side of the respective side frames 32 and 33, and the shaft members 54 and 55 are connected to bushes 62 and 63 through through-holes 60c and 61c formed at the highest portion of the linkage plates 60 and 61.

The linkage plates 60 and 61 are made of a plate member processed into the shape of the letter Z when seen from the side end face, which are composed of first flat portions 60a and 61a which are from the upper end to a halfway portion, and second flat portions 60b and 61b obtained by bending outward at a nearly right angle from the halfway portion and then further bending downward at nearly a right angle.

In the first flat portions 60a and 61a, respective two through-holes 60c and 60d, and 61c and 61d are provided, and the shaft members 54 and 55 are inserted into the upper through-holes 60c and 61c as described above. Screws 64 and 65 to connect the linkage plates 60 and 61 with respective side frames 32 and 33 of the back frame 30 are screwed into the lower through-holes 60d and 61d.

The second flat portions 60b and 61b are provided with respective three through-holes 60e, 60f, and 60g, and 61e, 61f, and 61g, at certain intervals along the vertical direction, and the second flat portions 60b and 61b are disposed to locate in the inside of respective side frames 42 and 43 of the seat frame 40. The upper through-holes 60e and 61e are placed along the long holes 42a and 43a formed in the side frames 42 and 43 of the seat frame 40, and guide shafts 66 and 67 are inserted between the through-holes 60e, 61e and the long holes 42a, 43a. Note that the guide shafts 66 and 67 have a diameter in a condition that the guide shafts 66 and 67 can move along the long holes 42a and 43a.

The second flat portions 60b and 61b are placed so that the through-holes 60f and 61f formed below the second flat portions are located along the inside of the arc-shaped long holes 22a and 23a formed in the base plate 20. Shafts 68 and 69 having a diameter in a condition that the shafts can move along the arc-shaped long holes 22a and 23a, are inserted between the through-holes 60f, and 61f, and the arc-shaped long holes 22a and 23a.

As a result of being assembled in this way, as shown in FIG. 1, when the seat is in use, the guide shafts 66 and 67 are placed in front of the long holes 42a and 43a, and the shafts 68 and 69 are also placed in front of the arc-shaped long holes 22a and 23a, and thereby the second flat portions 60b and 61b are pushed more forward in a slant direction than the first flat portions 60a and 61a in the linkage plates 60 and 61. As a result, the back frame 30 is supported by the linkage plates 60, 61 and the connection plates 50, 51 in an inverted shape of the letter V when seen from the side so that the back frame 30 and the seat frame 40 can be securely and stably supported in a wide opened position when in use.

Furthermore, the connecting position of the connection plates 50 and 51 or the linkage plates 60 and 61 with respect to the back frame 30, the position and size of the arc-shaped long holes 22a and 23a formed in the side plates 22 and 23 of the base plate 20, and the position and size of the long holes 42a and 43a formed in the side frames 42 and 43 of the seat frame 40 are determined in such a manner that the position of the upper end frame 31 of the back frame 30 is located to be right above or inside of the front end frame 41 of the seat frame 40 when the back plate 30 is pivoted to come close to the seat plate 40 to be folded (see FIG. 7). As above, since the back frame 30 and the seat frame 40 are formed in such a manner that the distance between the inner sides of the side frames 42 and 43 of the seat frame 40 is wider than the distance between the outer sides of the side frames 32 and 33 of the back frame 30, the back plate 30 can be folded in a state that the respective side frame 32 and 33 of the back plate 30 are surrounded by the side frames 42 and 43 of the seat frame 40 by setting the positional relation between the front end frame 41 and the upper end frame 31 to be as described above.

Here, the numeral 70 indicates a frame located around the back of the waist of a person sitting on the seat, that is, a waist frame disposed almost horizontally between the connection plates 50 and 51 facing each other. More concretely, as shown in FIG. 8, the waist frame 70 is supported by shaft members 71 and 72 being inserted into the through-holes 42b and 43b formed near the rear ends of the side frames 42 and 43 of the seat frame 40 through through-holes formed around the center of the connection plates 50 and 51, and the connection plates 50 and 51 are pivotable with respect to the waist frame 70.

The numeral 75 indicates a seat rear frame disposed almost horizontally between the second flat portions 60b and 61b of the linkage plates 60 and 61. The numeral 76 is a reinforcing plate to be fixed to each front end face by welding after the linkage plates 60 and 61 are put together with the side frames 32 and 33, and the numeral 77 is an auxiliary plate being laid between rear end faces of the connection plates 50 and 51 to help in supporting the load on the back frame 30 and the connection plates 50 and 51, when in use.

Figure 9:
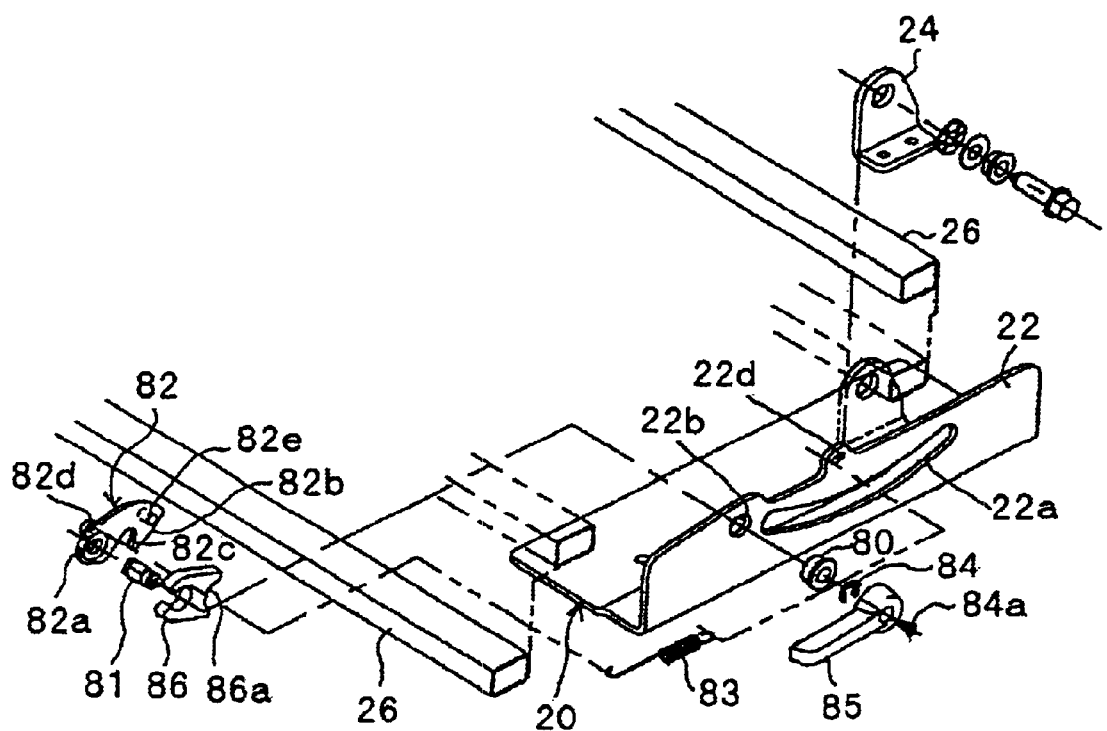
FIG. 9 is an enlarged view to explain a locking mechanism.

Next, a locking mechanism for keeping the back plate 30 and the seat plate 40 in a wide opened state when the seat is in use will be explained with FIG. 8 and FIG. 9. The locking mechanism comprises: locking shafts 81 and 81 to be inserted into locking bushes 80 and 80 which are fitted into holes 22b and 23b formed in front of the arc-shaped long holes 22a and 23a in the respective side plates 22 and 23 of the base plate 20; and locking plates 82 and 82 of which base ends 82a and 82a are connected to protruding portions of the locking shafts 81 and 81 protruding toward the inside of the side plates 22 and 23. The locking plates 82 and 82 have front ends 82b and 82b of which end faces are curved, and have cut-out portions 82c and 82c with a predetermined width which are cut out from the lower ends in the upward slanting direction. The position of the shafts 68 and 69 can be locked by engaging respective shafts 68 and 69 which are inserted into the arc-shaped long holes 22a and 23a of the respective side plates 22 and 23, with the cut-out portions 82c and 82c.

In more detail, in a normal condition, the locking plates 82 and 82 are downwardly forced around the base ends 82a and 82a, and when the shafts 68 and 69 touch the end faces of the curved front ends 82b and 82b, the shafts 68 and 69 push up the front ends 82b and 82b so that the shafts are housed inside the cut-out portions 82c and 82c. Though the method to force the locking plates 82 and 82 downward is optional, in the present embodiment uses coil springs 83 and 83 are used, which are arranged to engage one ends of the coil springs to engaging holes 82d and 82d formed on the upper portions near the base ends of the locking plates 82 and 82, and to engage the other ends to the interlocking holes 22d and 23d formed on the upper portions of the arc-shaped long holes 22a and 23a of the side plates 22 and 23 of the base plate 20. Since the one ends of the coil springs 83 and 83 are engaged to the engaging holes 82d and 82d formed on the upper portions near the base ends of the locking plate 82 and 82, the front ends 82b and 82b are forced downward around the base ends 82a and 82a.

The locking mechanism has a lock release lever 85 which connects with a locking shaft 81 protruding toward the outside of the side plate 22 through the locking bush 80 disposed on one of the side plates 22 side, and an e-ring 84 is disposed between the locking bush 80 and the lock release lever 85 which is connected to the locking shaft 81 with a screw 84a. At a normal position where the lock release lever 85 is forced by elastic force of the coil spring 83, as shown in FIG. 1, the lock release lever 85 is designed to be placed along the longitudinal direction of one of the side plates 22 of the base plate 20. When the front end of the lock release lever 85 is pulled down, one of the locking plates 82 pivots in a direction to break away the shaft 68 from the cut-out portion 82c through the locking shaft 81 so that the lock can be released.

At this time, a protrusion 82e provided on the front end of the locking plate 82 pushes up a protruding piece 104a of a set plate 104 which is always forced to pivot downward in FIG. 8 by a spring member 105 supported by the shaft 68, against the elastic force of the spring member 105. The set plate 104 is connected to a boss 102. The boss 102 is connected to a bush 101 attached to the through-hole 60g placed in the center of three through-holes formed in the second flat portion 60b of the linkage plate 60. A connection shaft 100 rotatably inserted into a seat rear frame 75 is attached to the bush 101 and the boss 102, and the bush 101 is connected to the connection shaft 100 through a snap pin 103. Accordingly, when the set plate 104 is pushed up as above to pivot in the left direction in FIG. 8, the connection shaft 100 pivots in the same direction, accompanied by the above-mentioned rotational movement.

On the other hand, a bush 111 is attached to the through-hole 61g which locates in the center among three through-holes formed in the second flat portion 61b of the other linkage plate 61, and a boss 112 and a set plate 114 are further connected to the bush 111. The other end of the connection shaft 100 is inserted into the bush 111 and the boss 112 and is connected through a snap pin 113. A spring member 115 is attached to the shaft 69 inserted into the through-hole 61f formed in the lower end of the second flat portion 61b of the other linkage plate 61, and this spring member 115 is linked to the set plate 114 and is forced to pivot downward in FIG. 8. The set plate 114 is provided with a protruding piece 114a which is able to abut on a protrusion 82e of the locking plate 82 disposed on the other side plate 23 side.

Accordingly, when the connection shaft 100 pivots as above, the set plate 114 disposed on the other linkage plate 61 side pivots in the same direction against the elastic force of the spring member 115, and its protruding piece 114a abuts on the protrusion 82e of the locking plate 82 disposed on the other side plate 23 side to allow the locking plate 82e to pivot upward around the base end 82a, that is, to pivot in a direction to detach the shaft 69 away from the cut-out portion 82c. Thus, the lock on the other side plate 23 side can be released in synchronization with the release of the lock on the side plates 22 side.

Stopper plates 86 and 86 which lie between the locking plates 82 and 82, and the side plate 22 and 23, in the inside of the side plate 22 and 23, are connected to the locking bushes 80 and 80 attached to holes 22b and 23b of respective side plates 22 and 23. Front end faces 86a and 86a of the stopper plates 86 and 86 are cut-out to form substantially arc-shaped recesses, and when the shaft 68 and 69 reach the front ends of the arc-shaped long holes 22a and 23a, the front end faces 86a and 86a abut on the shafts 68 and 69 to prevent the shafts 68 and 69 from falling down forward.

Next, the cushioning member in the present embodiment supported by the above-described back frame 30 and the seat frame 40 will be explained here. The cushioning member of the present embodiment is composed of a net member 90 in a three-dimensional structure in which a front mesh layer and a back mesh layer are bonded with a large number of piles. The net member 90 in the three-dimensional structure has a truss structure (a three-dimensional structure) in which a front mesh layer and a back mesh layer are connected with a large number of piles. This net member has an elastic structure with resistance to settling, is excellent in air permeability, in pressure dispersion characteristic caused by body weight, and in impact absorption characteristic, and can show a high cushioning ability even if it is of a thin type.

As described above, the present embodiment has a structure in which the total thickness in a folded state can be made thin, since the back frame 30 is surrounded by the seat frame 40 in the folded state. Therefore, it is necessary for the cushioning member supported by the seat frame 40 to be pressed by the back frame 30 to be depressed so that the back frame 30 is placed in the inside of the seat frame 40 when the seat is folded. For this purpose, it is preferable to compose a cushioning member from a net member having a three-dimensional structure which has a sufficient impact absorption characteristic, etc. though the net member is of a thin type, can be set by banging around its edges onto the side frames 42 and 43, and is possible to be depressed in such a manner that the side edges of the net member slide turning inward around the side frames 42 and 43 when the net member is pressed by the back frame 30.

Respective cushioning members supported by the back frame 30 and the seat frame 40 can be set separately, but it is preferable to use a net member 90 which has a one-piece structure united integrally with two cushioning members as in the present embodiment.

By adopting the net member 90 having such a one-piece structure as in the present embodiment, the central portion having the best cushioning property is located under a portion from the haunches to the waist where receives the largest load when being seated. Accordingly, the cushioning property of the net member 90 is effectively exhibited, the hard touch feeling caused by the waist frame 70 and the seat rear frame 75 which are disposed on the border of the seat back and the seat cushion is reduced and the feeling of seating can be improved. It is needless to say that a backing cloth (not shown) can be provided, if necessary.

Figure 4:
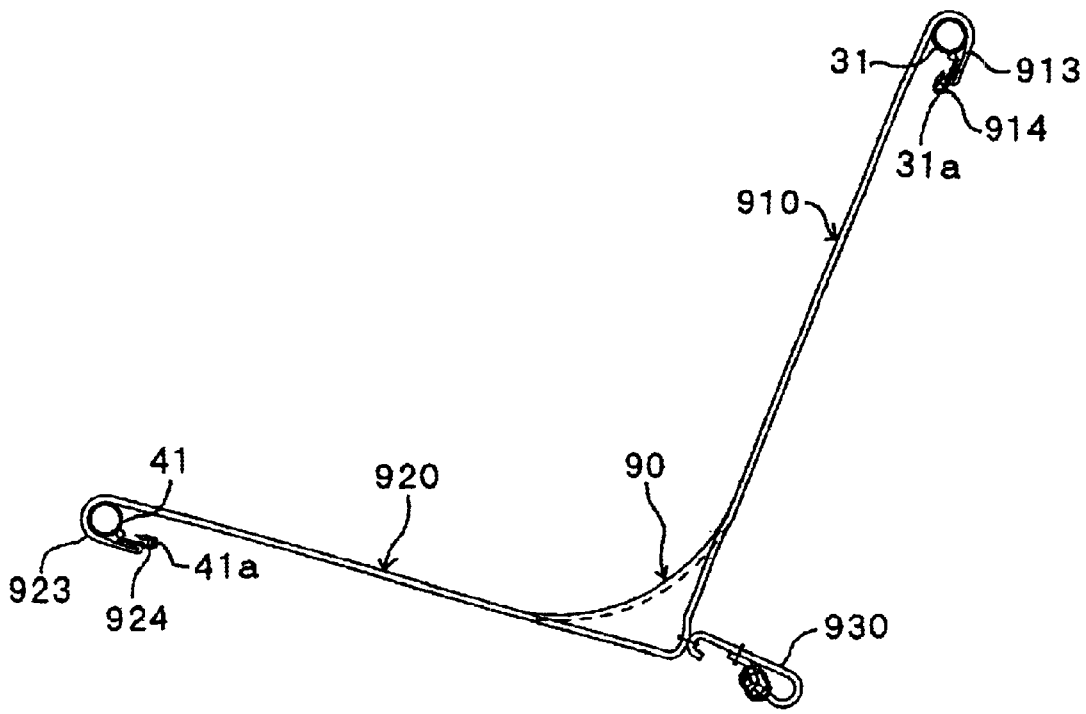
FIG. 4 is a sectional view taken along the line B—B in FIG. 1.
Figure 10:
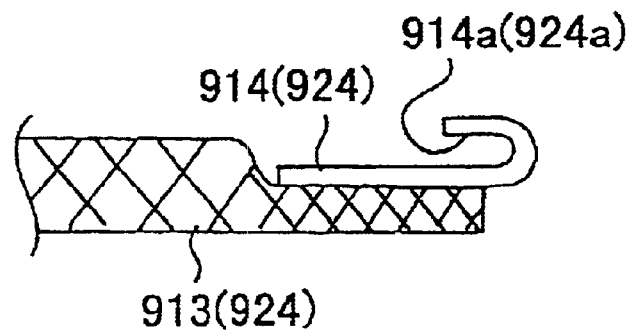
FIG. 10 is a view to explain an engaging plate.

More concretely, as shown in FIG. 8, the net member 90 is formed to constitute a back cushion 910 supported by the back frame 30 and a seat cushion 920 supported by the seat frame 40, being bounded by around the center. The back cushion 910 is comprised of side edges 911, 912 which are sewed together to be substantially a cylindrical shape, and an upper edge 913 formed to protrude upward. As shown in FIG. 4 and FIG. 10, an engaging plate 914, made of plastic and provided with an engaging portion 914a which is folded back toward the opposite side at the front end, is fixed tightly at two separated places in the width direction on the back face of the upper edge 913 by means of vibration welding. The respective side frames 32 and 33 of the back frame 30 are inserted into the nearly cylindrical side edges 911 and 912, the upper edges 913 are pulled round backward from the upper end frame 31 of the back frame 30, and an engaging wire 31a provided facing downward on the upper end frame 31 are engaged with the respective engaging portions 914a of the engaging plate 914.

A seat cushion 920 includes side edges 921 and 922 which are sewed together to be substantially a cylindrical shape, and a front edge 923 formed to protrude forward. As shown in FIG. 4 and FIG. 10, an engaging plate 924 provided with an engaging portion 924a similar to the above-described back cushion 910 is fixed tightly at two separated places in the width direction on the back face of the front edge 923. The respective side frames 42 and 43 of the seat frame 40 are inserted into nearly cylindrical side edges 921 and 922, the front edge 923 is pulled round from the front side of the front end frame 41 of the seat frame 40 to the back side, and the engaging portion 924a of the each engaging plate 924 of the front edge 923 is engaged to an engaging wire 41a provided on the front end frame 41 of the seat frame 40.

Thus, the net member 90 in a one-piece structure is supported by the back frame 30 and the seat frame 40 to serve as a cushioning member. It should be noted that the nearly cylindrical side edges 921 and 922 of the seat cushion 920, which are disposed at least around respective side frames 42 and 43 of the seat frame 40, are formed to have their inside diameter a little larger than the diameter of the side frames 42 and 43 with a clearance in order that the cushioning member can be depressed in such a manner that the side edges 921 and 922 slide inward around the side frames 42 and 43 when pressed by the back frame 30.

The numeral 930 indicates a straining member provided at two separated places in the width direction near a lower portion of the back face of the back cushion 910. As shown in FIG. 1 and FIG. 4, the straining member 930 is fixed on the back cushion 910 to protrude backward and is wound around the waist frame 70. With this straining member 930, the back cushion 910 is to be securely hung. The straining member 930 is acceptable so far as it has such a function. Accordingly, it can be composed of a net member having a three-dimensional structure similar to the back cushion 910, or it can be composed of cloth, or a plastic sheet, etc.

Figure 11:
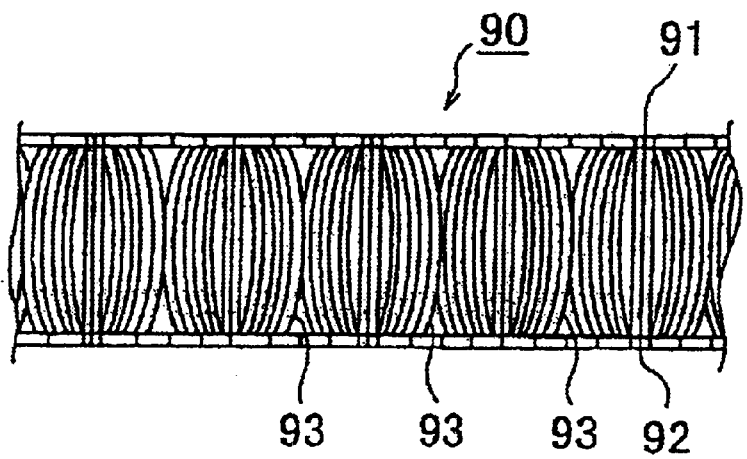
FIG. 11 is a sectional view showing a portion of a net member in a three-dimensional structure, which is used in the above embodiment.

The net member 90 in a three-dimensional structure has formation as follows. As shown in FIG. 11, the net member 90 is formed of a stereoscopic truss structure (a three-dimensional structure) including the front mesh layer 91, the back mesh layer 92, and a number of piles 93 which connect the front mesh layer 91 and the back mesh layer 92.

Figure 12:
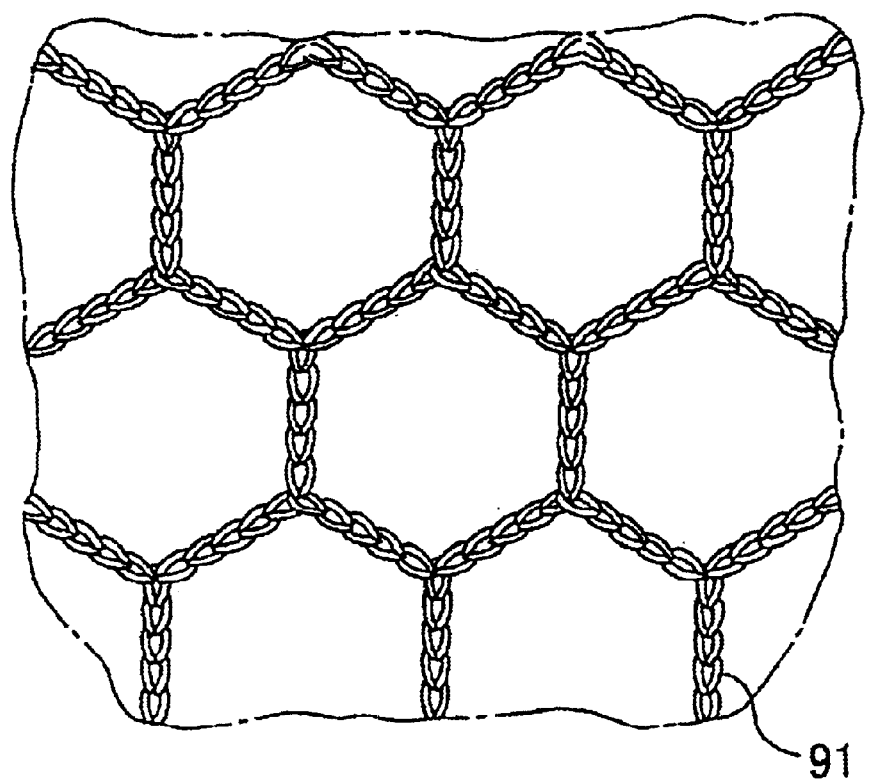
FIG. 12 is an enlarged view showing a front mesh layer of the net member shown in FIG. 11.
Figure 13:
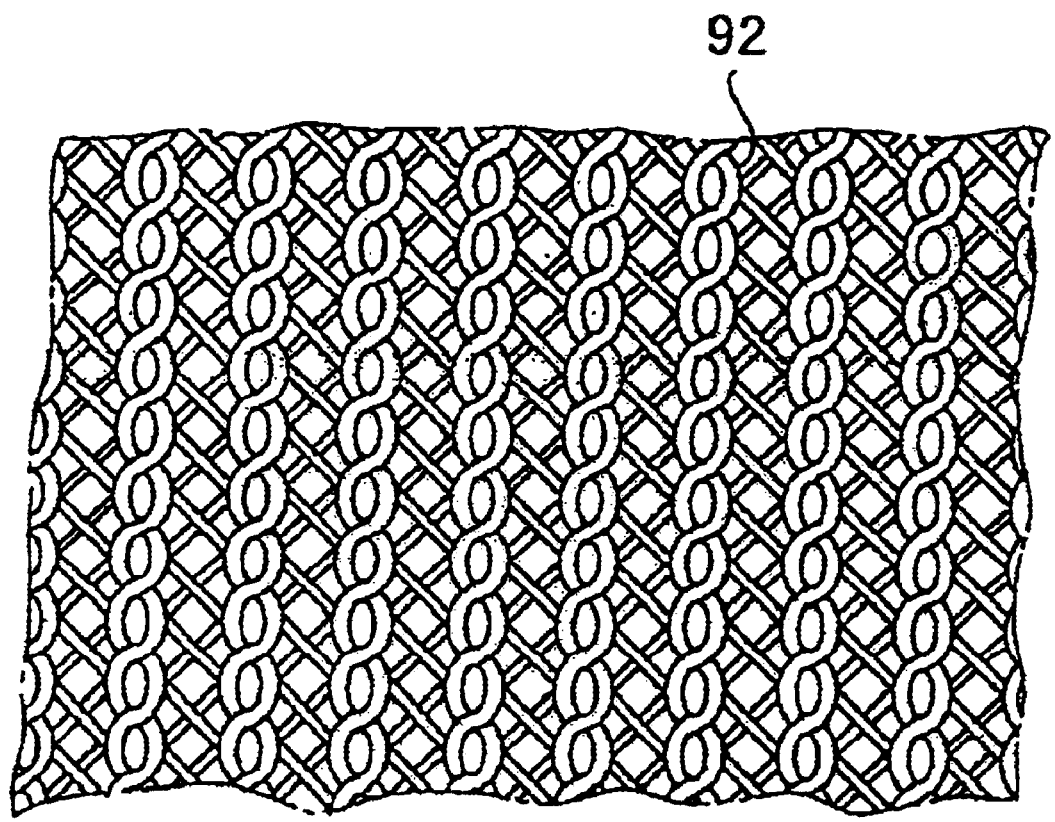
FIG. 13 is an enlarged view showing a back mesh layer of the net member shown in FIG. 11.
Figure 14A:
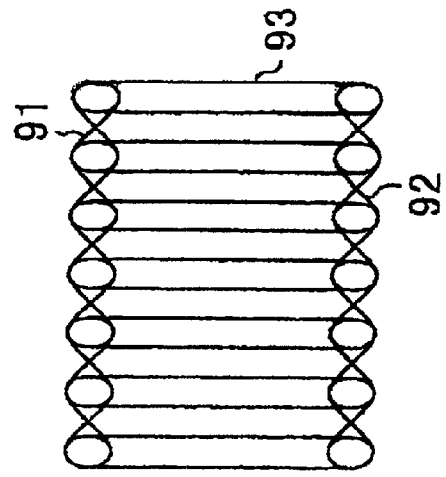
FIG. 14A to FIG. 14E are views to explain the way of arranging piles.
Figure 14B:
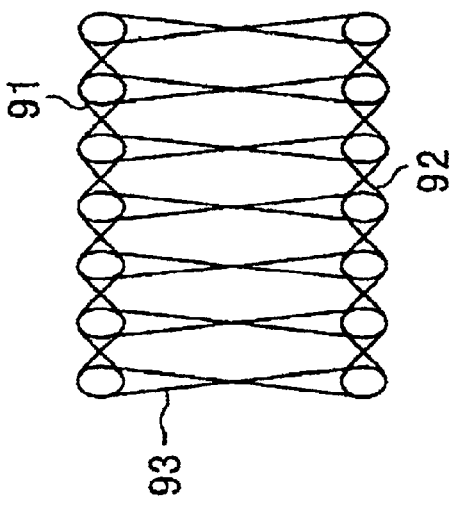
Figure 14C:
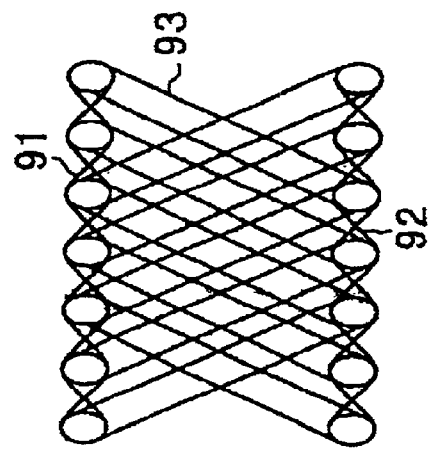
Figure 14D:
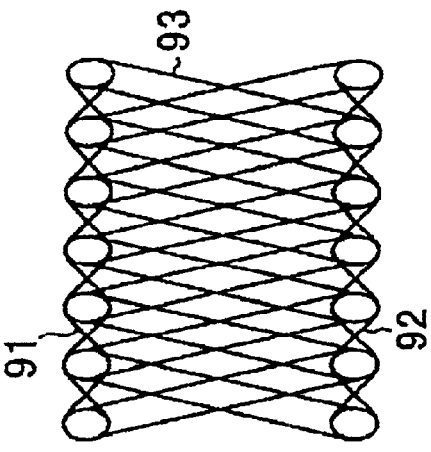
Figure 14E:
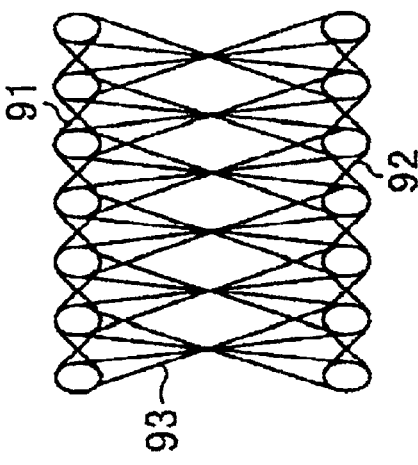

The front mesh layer 91 is formed into a structure having, for instance, a honeycombed (hexagonal) mesh made from multifilaments stranded of monofilaments, as shown in FIG. 12. The back mesh layer 92 is formed, for instance, by rib knitting of multifilaments stranded from monofilaments, as shown in FIG. 13, into a structure having smaller mesh (fine mesh) than the honeycombed mesh of the front mesh layer 91. The pile 93 is formed of monofilaments or multifilaments which are knitted connecting between the front mesh layer 91 and the back mesh layer 92 so that the front mesh layer 91 and the back mesh layer 92 maintain a predetermined space from each other, thereby giving a predetermined stiffness to the net member 90 which is now a stereoscopic mesh knit. Incidentally, when the word "fiber" is simply used in this description, it means to include spun yarn as well as a monofilament and a multifilament.

In addition, though in the above explanation, a layer having a honeycombed mesh is defined as the front face (for instance, a surface of the seat cushion and seat back being in contact with the human body), it is acceptable to define the above as the back face, and a layer having a small mesh as the front face. It is also acceptable to adopt a mesh shape other than a honeycombed shape or a fine mesh shape as a structure of the mesh layer, as shown in table 1 to be described later.

As a material to compose the front mesh layer 91, the back mesh layer 92 or the pile 93, a thermoplastic resin is preferable. The following resins can be used, for instance, thermoplastic polyester resin such as polyethylene terephthalate (PET) and polybutylene terephthalate (PBT), polyamide resin such as nylon 6 and nylon 66, polyolefin resin such as polyethylene and polypropylene, or a mixed resin containing more than two kinds of these resins.

The thickness of a fiber composing the pile 93 should be, for instance, more than 380 d, preferably 600 d or more. Then, the load generated by a person who sits on the seat can be supported through deformation of the mesh composing respective mesh layers 91 and 92, and falling of the pile 93, so that the seat can be of a soft structure without concentration of stress.

Several characteristics of the examples usable as the net member 90 in a three-dimensional structure relating to the present embodiment will be shown in Table 1.

TABLE 1

| NUMBER | | 1 | 2 | 3 | 4 | 5 | 6 |
|---|---|---|---|---|---|---|---|
| MATERIAL | | NYLON | POLYESTER | ← | ← | ← | ← |
| WEIGHT (g/m²) | | 888 | 784 | 864 | 984 | 876 | 1128 |
| DENSITY | LONGITUDINAL (PIECE/inch) | 8.0 | 7.5 | ← | 8.5 | 7.0 | 8.5 |
| | LATERAL (PIECE/inch) | 14.0 | 13.0 | ← | ← | 14.0 | 13.0 |
| THICKNESS OF FIBER | FRONT FACE | 220d/1f | 1300d/96f | ← | ← | ← | ← |
| | BACK FACE | | 500d/70f | ← | ← | ← | ← |
| | PILE | 880d/1f | 600d/1f | ← | ← | 800d/1f | ← |
| TENSILE STRENGTH (kg/5 cm) | LONGITUDINAL | 38.0 | 156.9 | 158.4 | 152.1 | 148.7 | 159.3 |
| | LATERAL | 24.8 | 62.1 | 79.4 | 136.5 | 57.5 | 130.1 |
| ELONGATION (%) | LONGITUDINAL | 111.1 | 56.2 | 62.5 | 48.3 | 50.1 | 50.2 |
| | LATERAL | 189.3 | 66.4 | 68.2 | 43.3 | 78.0 | 40.0 |
| TEAR STRENGTH (kg) | LONGITUDINAL | 33.8 | 87.9 | 79.2 | 75.0 | 91.1 | 77.7 |
| | LATERAL | 26.2 | 49.2 | 44.9 | 63.7 | 41.1 | 66.7 |
| DISTORTION RATIO BY REPEATED LOADING | LONGITUDINAL | — | 2.6 | ← | 2.7 | 1.4 | 1.2 |
| | LATERAL | — | 10.6 | 2.7 | 5.6 | 4.6 | 0.2 |
| ABRASION RESISTANCE | LONGITUDINAL | — | 4.5 | ← | ← | ← | ← |
| | LATERAL | — | 4.0 | ← | 4.5 | ← | ← |
| MESH LAYER STRUCTURE | FRONT | MESH | HONEY COMB | ← | MESH | HONEY COMB | MESH |
| | BACK | MESH | FINE MESH | ← | FINE MESH | FINE MESH | FINE MESH |
| PILE STRUCTURE | | PARALLEL | CROSS | PARALLEL | CROSS | PARALLEL | CROSS |

In table 1, "d" indicates "denier" and "1 d" is a unit of thickness when one gram of fiber material is pulled to 9,000 m. For example, "220 d" means that the fiber has a thickness obtained by pulling one gram of the fiber to 9,000/220=40.9 m. The letter "f" means "filament" which is a unit for expressing the number of monofilaments. For example, "70 f" means that one piece of thread is composed of 70 pieces of monofilaments. An expression "kg/5 cm" used for tensile strength is the strength required to pull a test piece of 5 cm width. An expression "parallel" used for the pile structure means a state that the piles 93 connecting the front mesh layer 91 and the back mesh layer 92 do not cross each other seen from a side, while "cross" means a state that the piles cross each other seen from a side.

As a manner of disposing the pile 93 (pile structure), it can be classified by a state of the piles 93 connecting between the front mesh layer 91 and the back mesh layer 92 seen from the pile side, more concretely, for instance, it can be classified into the following types shown in FIG. 14. FIG. 14A and FIG. 14B show a straight type in which the piles 93 are disposed to connect between respective fibers composing the front mesh layer 91 and respective opposing fibers composing the back mesh layer 92, in which FIG. 14A shows a straight type knitted in the shape of the letter "8", while FIG. 14B show simply knitted straight. From FIG. 14C to FIG. 14E show cross types in which the piles 93 are knitted between respective adjacent threads for the front mesh layer 91 and respective adjacent threads for the back mesh layer 92 in such a manner that the piles 93 cross each other at the halfway. Among them, FIG. 14C shows a type in which the piles 93 cross in the shape of the letter "8", FIG. 14D shows another cross type in which the pile 93 are knitted in a simple cross, and FIG. 14E shows still another cross type in which the piles 93 are crossed each other bringing two pieces together (double cross).

Figure 5:
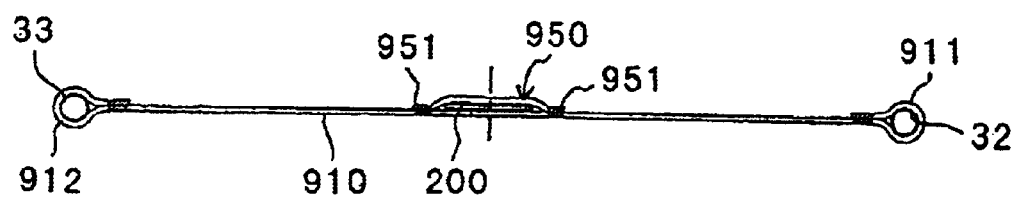
FIG. 5 is a sectional view taken along the line C—C in FIG. 1.
Figure 6:
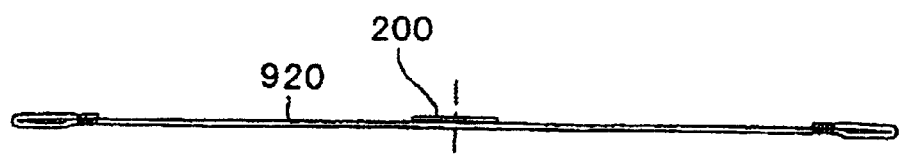
FIG. 6 is a sectional view taken along the line D—D in FIG. 1.

As shown in FIG. 1, FIG. 5 and FIG. 8, covering members 950, 960 are attached which are disposed on substantially central portion in the width direction of the respective back sides of the back cushion 910 and the seat cushion 920, and the side edges 951 and 961 of the covering members are fixed tightly on the back cushion 910 and the seat cushion 920 respectively. The covering members 950 and 960 are formed in a cylindrical shape with respective back faces of the back cushion 910 and seat cushion 920 (see FIG. 5). One of the covering members 950 is attached on a portion from the upper portion to the lower portion of the back cushion 910, and the other covering member 960 is attached on a portion from the rear portion to the front portion of the seat cushion 920.

The covering members 950 and 960 may be formed with, for instance, the above-described net member 90 having a three-dimensional structure. But the covering members 950 and 960 are satisfactory so far as they are formed in a cylindrical shape with respective back faces of the back cushion 910 and the seat cushion 920, and a belt member 200 can be inserted into a hollow portion of the cylinder thus formed, therefore it can be formed with other material such as clothes. However, the covering member is required to have enough strength not to be damaged when a load is applied on the belt member 200 and the covering member is preferably formed of a net member 90 having a three-dimensional structure as in the present embodiment.

When the covering member is formed of, for instance, a net member 90 having a three-dimensional structure, a vibration welding means or a sewing means can be adopted as a means for fixing the covering members 950 and 960 on respective back faces of the back cushion 910 and the seat cushion 920, but the vibration welding means has an advantage that facial stiffness of the back cushion 910 and the seat cushion 920 at the welded portion can be increased.

Figure 2:
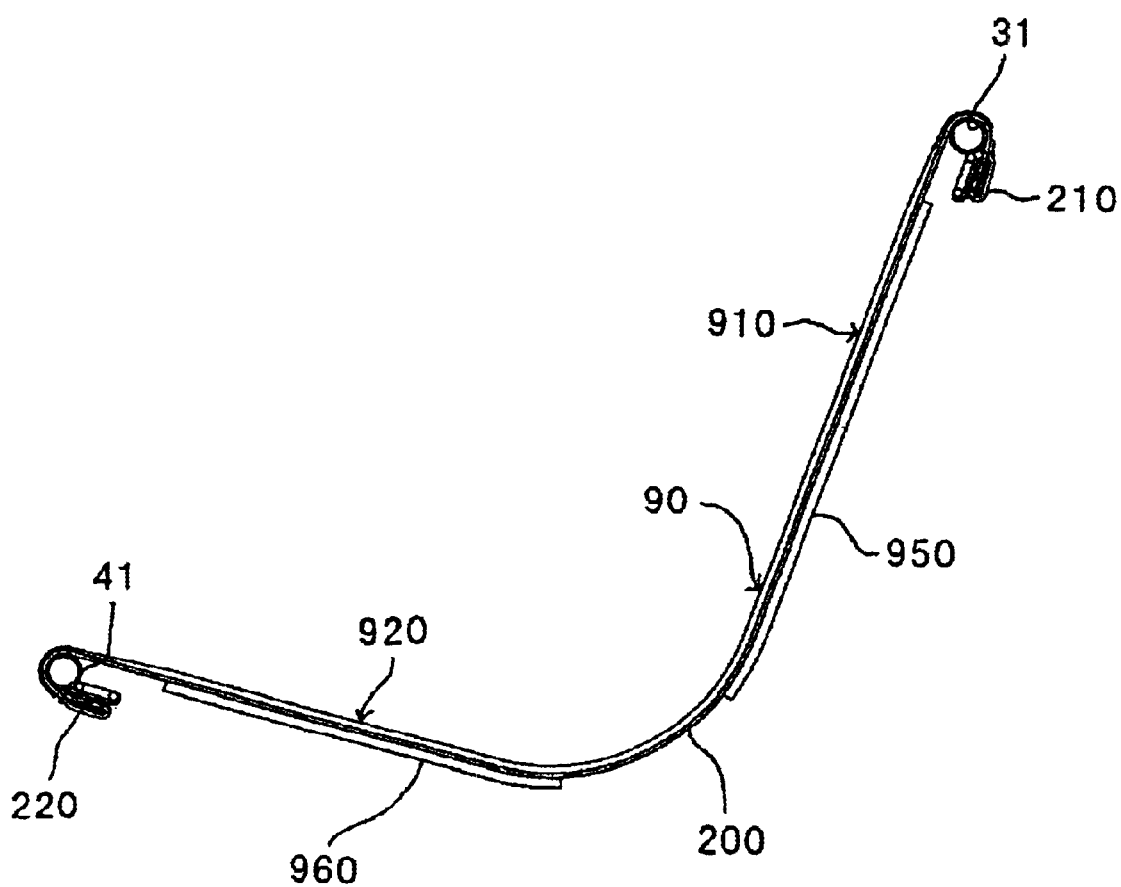
FIG. 2 is a sectional view taken along the line A—A in FIG. 1.

It is preferable that the belt member 200 is made of a flat cloth having optional thickness formed of synthetic fibers, has higher stiffness than the above-described net member 90 having a three-dimensional structure composing a cushioning member, and has high strength as is adopted for such as a seat belt for a car. As shown in FIG. 2, the belt member 200 is held by engaging with an upper end frame 31 of the back frame 30 at its one end 210, and is inserted through the hollow portion which is formed with the back cushion 910 and one of the cover members 950. Then the belt member 200 passes through behind the waist frame 70, and passes between the seat cushion 920 and the other cover member 960. The other end 220 of the belt member 200 is also held by engaging with the front end frame 41 of the seat frame 40.

Figure 3A:
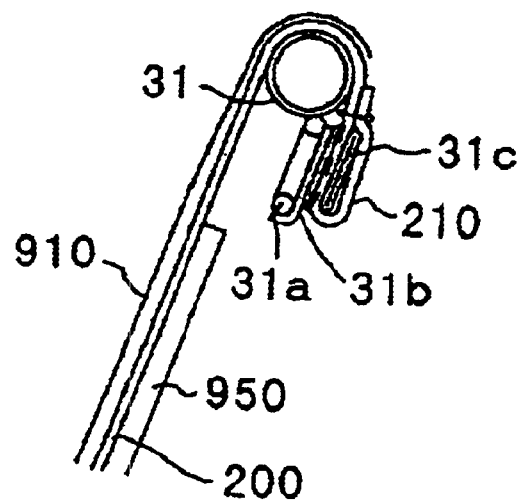
FIG. 3A is a view showing a fixing state of a belt member to an upper end frame.

As described above, the back cushion 910 is engaged with an engaging wire 31a which are provided downward on the upper ends 913 by the engaging plates 914 provided at two separated places in the width direction on the upper ends 913. Accordingly, the back cushion 910 is not engaged nearly at a middle portion of the engaging wire 31a, and in the present embodiment, a fixing member for the belt member 200 is provided on around this middle portion. As shown in FIG. 8, the fixing member comprises a base plate 31b fixed tightly on around the middle portion of the engaging wire 31a by welding, and a fixing plate 31c which is connected to the base plate 31b with screws at its both ends and bent in a shape to have a gap between the base plate 31b and the fixing plate 31c. As shown in FIG. 3A, one end 210 of the belt member 200 is pulled out from an upper end opening of the covering member 950, and is hung around the upper end frame 31. Then the end 210 of the belt member 200 is inserted through the gap between the base plate 31b and the fixing plate 31c, turned up from the lower side toward the upper side, and fixed with the corresponding opposite portion of the belt member 200 at the upper portion of the fixing plate 31c by sewing.

Figure 3B:
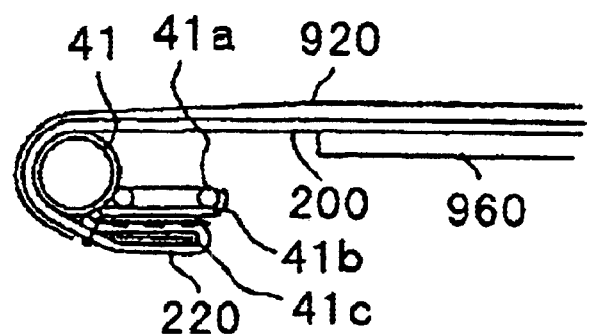
FIG. 3B is a view showing a fixing state of the belt member to a front end frame.

Since the seat cushion 920 is engaged with the front end frame 41 using the engaging plates 924 provided at two separated places in the width direction, another fixing member for the belt member 200 is provided around the middle portion of the engaging wire 41a provided on the front end frame 41. As shown in FIG. 8, the fixing member comprises a base plate 41b fixed tightly on around the middle portion of the engaging wire 41a by welding, and a fixing plate 41c which is connected to the base plate 41b with screws at its both ends and bent in a shape to have a gap between the base plate 41b and the fixing plate 41c. As shown in FIG. 3B, the other end 220 of the belt member 200 is pulled out from a front end opening of the covering member 960, and is hung around the front end frame 41. Then, the end 220 of the belt member 200 passes through the bottom face of the fixing plate 41c and turns back toward front end side, and fixed with the corresponding portion of the belt member 200 at the frond portion of the fixing plate 41c by sewing in a state that the end 220 is inserted through the gap between the base plate 41b and the fixing plate 41c.

As a result of the above disposition, the belt member 200, as shown in FIG. 1, FIG. 2 and FIG. 8, is disposed along the back face of the back cushion 910 and the seat cushion 920 in a direction along the longitudinal cross-section. It should be noted that the length of the belt member 200 is designed to be shorter than the length of an expanded state of the back cushion 910 and the seat cushion 920 in the overlapping area with the belt member 200 in a direction along the longitudinal cross-section. In the present embodiment, since the belt member 200 and the cushioning members 910 and 920 are overlapped each other from the upper end frame 31 of the back frame 30 to the front end frame 41 of the seat frame 40, the length of the belt member 200 in that range is designed to be shorter than the length in an expanded state (no load state without any expansion and contraction) of the net member 90 having a three-dimensional structure, composing the back cushion 910 and the seat cushion 920 in a one-piece structure.

Next, the function of the present embodiment will be explained. The function relating to a folding mechanism will be explained first.

When the folding seat 10 of the present embodiment is folded from the state shown in FIG. 1 in which the seat is in use to the state shown in FIG. 7, both of the locking plates 82 and 82 are pivoted through the connection shaft 100 against the coil springs 83 and 83 by pushing down the front end side of the lock release lever 85 to release the engagement between the locking plates 82, 82 and the shafts 68, 69. Then, the seat back is pushed down forward. While the seat back is falling down forward, the linkage plates 60 and 61 linked to the back frame 30 also fall down forward. Accordingly, the shafts 68 and 69 inserted into the through-holes 60f and 61f provided below the linkage plates 60 and 61 move backward in a manner that they draw an arc along a lower orbit of the linkage plates 60 and 61, in other words, along the arc-shaped long holes 22a and 22b of the base plate 20.

Simultaneously, the connection plates 50 and 51 connected to the back frame 30 pivot around the shaft members 54 and 55 disposed on the brackets 24 and 25 of the base plate 20 as if they fall forward. At this time, the connection plates 50 and 51 pivot relatively to the side frames 42 and 43 of the seat frame 40.

On the other hand, as for the linkage plates 60 and 61, the spaces between the lower portions of respective linkage plates and the connection plates are getting close from a state that the linkage plates and the connection plate form an inverted shape of the letter "V" when seen from the side. The guide shafts 66 and 67 linked to the linkage plates 60 and 61 also move backward along an orbit drawing an arc, and the guide shafts 66 and 67 are linked to the long holes 42a and 43a of the seat frame 40.

As a result, when the connection plates 50 and 51 are falling down forward while pivoting, the seat frame 40 approaches the base plates 20 and 21 while coming up forward. Since accompanied by coming up of the seat frame 40 forward, the guide shafts 66 and 67 move backward in the long holes 42a and 43a relatively, the back frame 30 approaches the seat frame 40. As described above, since the dimension of the back frame 30 is smaller than the seat frame 40, the back frame 30 abuts the seat cushion 920 supported by the seat frame 40 in the net members 90.

Furthermore, when the back frame 30 falls forward, the back frame 30 presses the seat cushion 920. At this time, the substantially cylindrical side edges 921 and 922 of the seat cushion 920 slide inward with respect to the side frames 42 and 43 so that the seat cushion 920 is depressed by being pressed with the back frame 30 and the back cushion 910. As a result, the side frames 32 and 33 of the back frame 30 is folded in a state to be surrounded by the side frames 42 and 43 of the seat frame 40.

Accordingly, the total thickness of the seat 10 in a folded state is not the thickness of the seat cushion composed of the seat frame 40 and the seat cushion 920 plus the thickness of the seat back composed of the back frame 30 and the back cushion 910, but the thickness can be within nearly the same thickness as, or a little thicker than, the thickness of the seat cushion or the seat back alone.

When the seat changes its state from being folded as shown in FIG. 7 to being in use as shown in FIG. 1, reversely to the above, the seat back is raised backward. Then, each member moves completely in the reverse direction. When the shafts 68 and 69 inserted into the arc-shaped long holes 22a and 23a reach a front position in the arc-shaped long holes 22a and 23a, the shafts 68 and 69 push up the locking plate 82, and are linked and locked into the cut-out portions 82c and 82c of the locking plate 82 with the help of elastic force of the coil springs 83 and 83. Since respective shafts 68 and 69 abut on the stopper plates 86 and 86 in this state, the seat is supported stably in a state that the seat back is raised up as shown in FIG. 1.

The function of the belt member 200 will be explained next.

When a person takes a seat, the seat is set to be in a state of "in use" as shown in FIG. 1, but since the seat 10 in the present embodiment is for two persons, two persons sit between the belt member 200 and one side frame 42 (hereinafter, referred to as "one seat cushion 920A") and between the belt member 200 and the other side frame 43 (hereinafter, referred to as "the other seat cushion 920B") respectively on the seat cushion 920.

Accordingly, since the net member 90 having a three-dimensional structure has an expansion and contraction property, one seat cushion 920A and the other seat cushion 920B sink respectively. But, since the belt member 200 is higher in stiffness than the three-dimensional net member 90, and the length of the belt member 200 in the range of overlapping portion with the net member 90 is designed to be shorter as described above, even if persons take seats, the belt member 200 does not sink not to follow the respective seat cushions 920A and 920B, in other words, there seldom occurs a change of position in the vertical direction of the belt member 200.

This occurs in the same way when load due to the weight of the sitting persons are applied on the portion between the belt member 200 and one side frame 32 (hereinafter, referred to as "one back cushion 910A"), and the portion between the belt member 200 and the other side frame 33 (hereinafter, referred to as "the other back cushion 910B") respectively. One back cushion 910A and the other back cushion 910B sink due to respective expansion and contraction properties, but the belt member 200 does not follow the movement of the back cushions 910A and 910B, and almost no change of position occurs in its fore-and-aft direction.

Therefore, the central portions and around thereof in the width direction of both the back cushion 910 and the seat cushion 920 where the belt member 200 is disposed are forced to relatively rise, which serves as a waist-supporting mechanism enabling to hold the sitting persons. In addition, the amount of the depression (the amount of the contraction) of one and the other back cushions 910A and 910B, and one and the other seat cushions 920A and 920B with the belt member 200 interposed therebetween differs according to the physique of the sitting person (weight, etc). For instance, when a person having heavy weight takes the seat, the amount of the depression is larger than the case when a person having light weight takes the seat. Therefore, relative position of the cushion corresponding to the belt member 200 differs according to the difference in the physique. Therefore, according to the present embodiment, such a special mechanism as a conventional adjusting mechanism for the waist-supporting force like an air supplying and exhausting mechanism, and the like, is not required, and an appropriate waist-supporting function in response to difference in the physique can be exhibited.

In addition, the belt member 200 is just inserted into the hollow portions of respective covering members 950 and 960 each forming a cylindrical shape, and is not fixed on the covering members 950 and 960 or on the back cushion 910 and the seat cushion 920. In other words, the movement of the belt member 200 is not controlled within the covering members 950 and 960. As described above, the positional change of the belt member 200 in the direction of the depression is small when a person takes a seat in a predetermined posture. But, since the belt member 200 can move freely within the covering members 950 and 960, when the sitting person changes the posture, the belt member 200 follows it toward right or left, so that the relative bulged position in the right and left direction can be changed. In a case when a place to which a heavy load is applied is changed, a place which is bulged out extensively changes its position in the fore-and-aft direction. Accordingly, the belt member 200 can exhibit a waist-supporting function which corresponds flexibly to the change of posture of the sitting person.

Even when the seat of the present embodiment is for two persons as the seat 10 in this embodiment, it is possible to perform the waist-support for each sitting person only by disposing the belt member 200 at the midpoint position. In order to support the waist of each sitting person, the conventional seat for plural persons has been provided with a frame member at a suitable portion corresponding to a place between the sitting persons to bulge out the portion, but according to the present embodiment, the seat can support the waist of each sitting person without providing such a frame member.

It should be noted that the seat of the present invention is not limited to the above-described embodiment. Though the explanation is made taking a seat for two persons as an example, the present invention can be applied to a seat for plural persons such as for three persons or more, or it can be applied to a seat for a single person. When the present invention is applied to the seat for a single person, one belt member is disposed along respective side frames 32 and 42 being in a side and, at the same time, the other belt member is disposed along respective side frames 33 and 43 being the other side of the back frame 30 and the seat frame 40 so that the belt members 200 are located on both sides of the sitting person. According to this structure, when a person takes a seat, the both sides thereof are to be bulged out relatively, the waist-supporting function can be exhibited as in the above-described embodiment.

Figure 15:
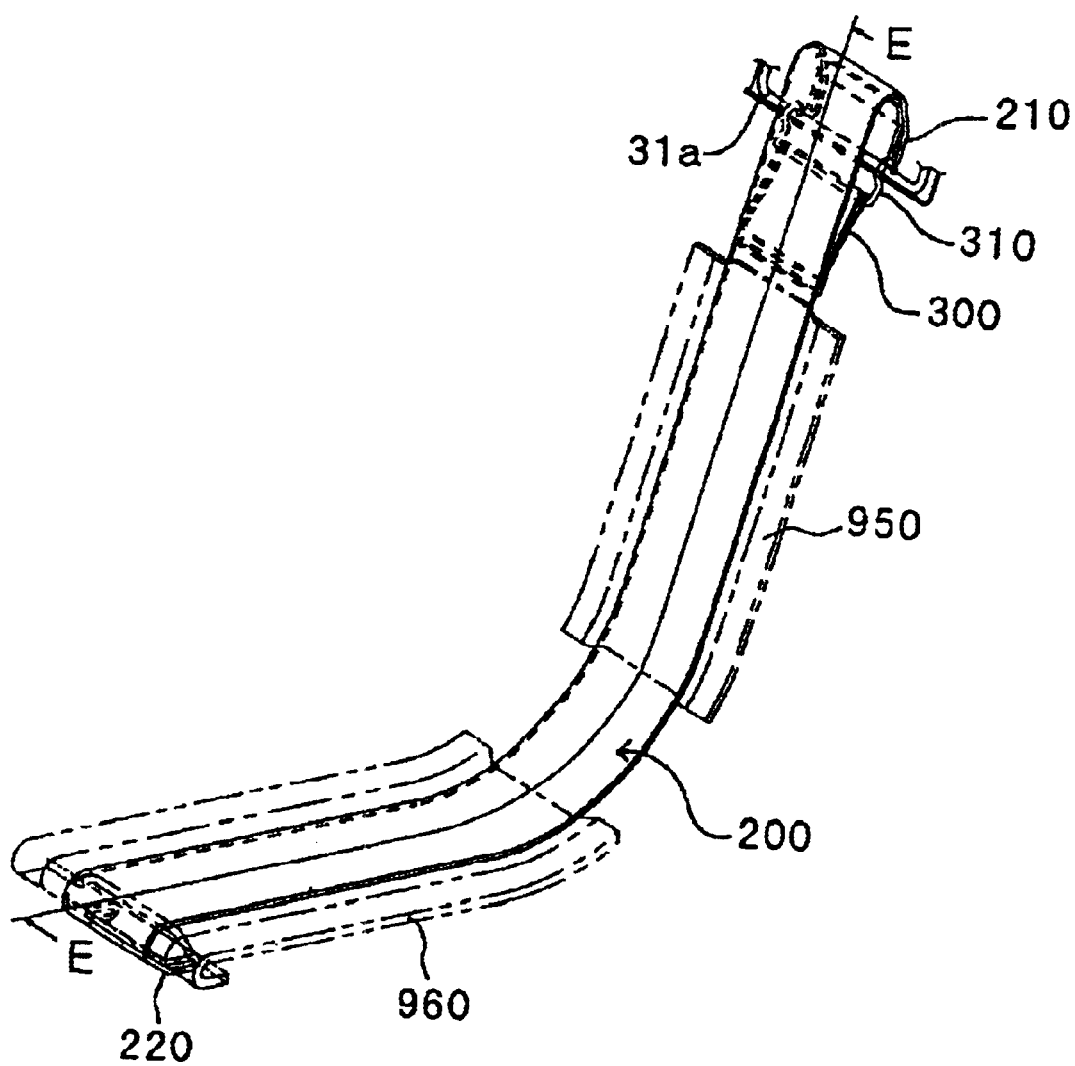
FIG. 15 is a perspective view partially showing a state in which a restoration property is given to the belt member using an elastic band member.
Figure 16:
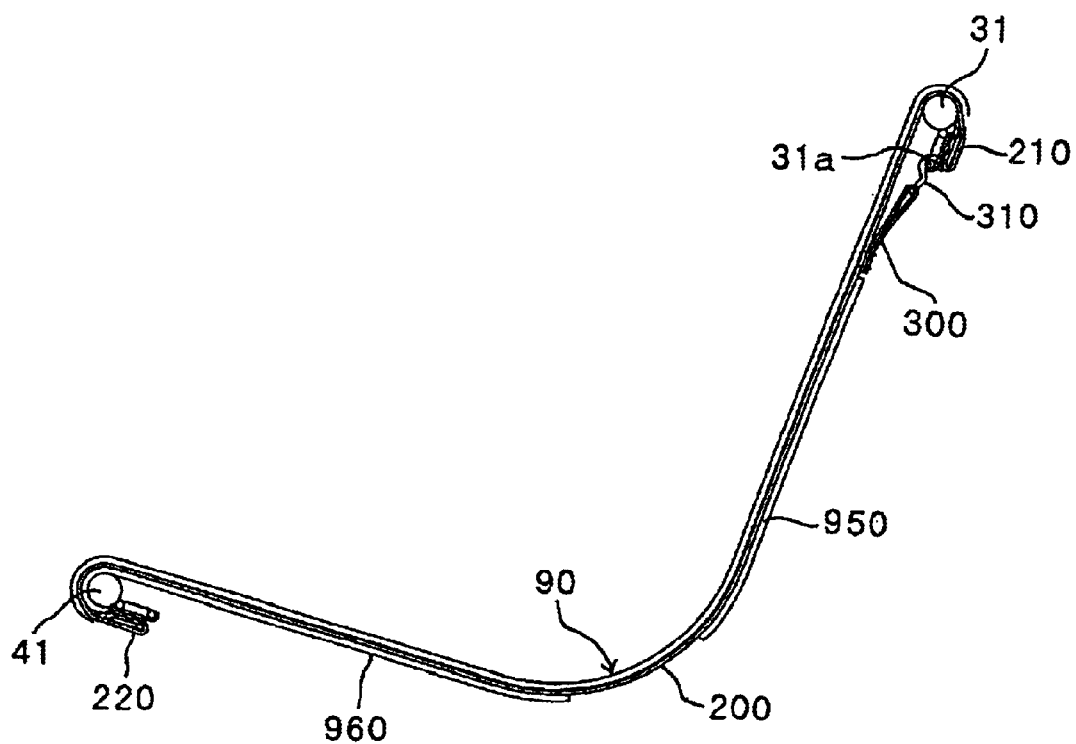
FIG. 16 is a sectional view taken along the line E—E in FIG. 15.
Figure 17:
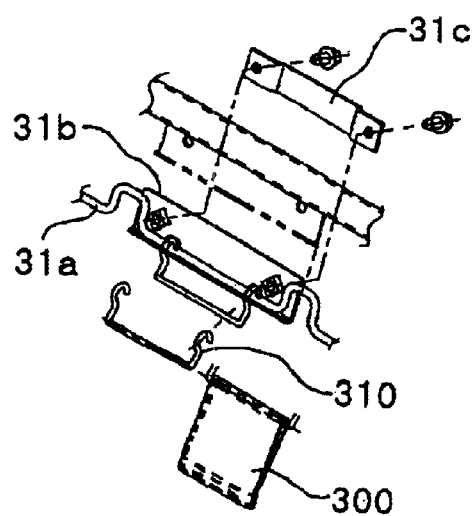
FIG. 17 is a view showing a fixed portion of the band member to an engaging wire.

In addition, the belt member can be a structure to have a restoration property so far as the stiffness of the belt member is higher than that of the cushioning member such as the net member having a three-dimensional structure in the above-described embodiment. As a means for providing such a restoration property to the belt member, for instance, the provision of the restoration property can be attained by adopting material having elastic force, at least, in a portion as the material to compose the belt member. Further, it is possible to provide the restoration property by adopting such a structure that, as shown in FIG. 15 to FIG. 17, an elastic band member 300 including a rubber material, at least, in a portion is connected to the halfway of the belt member 200 by sewing or the like, a hanging member 310 is connected to the other end of the band member 300, and then the hanging member 310 is engaged with the engaging wire 31a. It should be noted that the elastic force of the elastic band member 300 is previously adjusted so that the belt member 200 can be pulled up.

Figure 18:
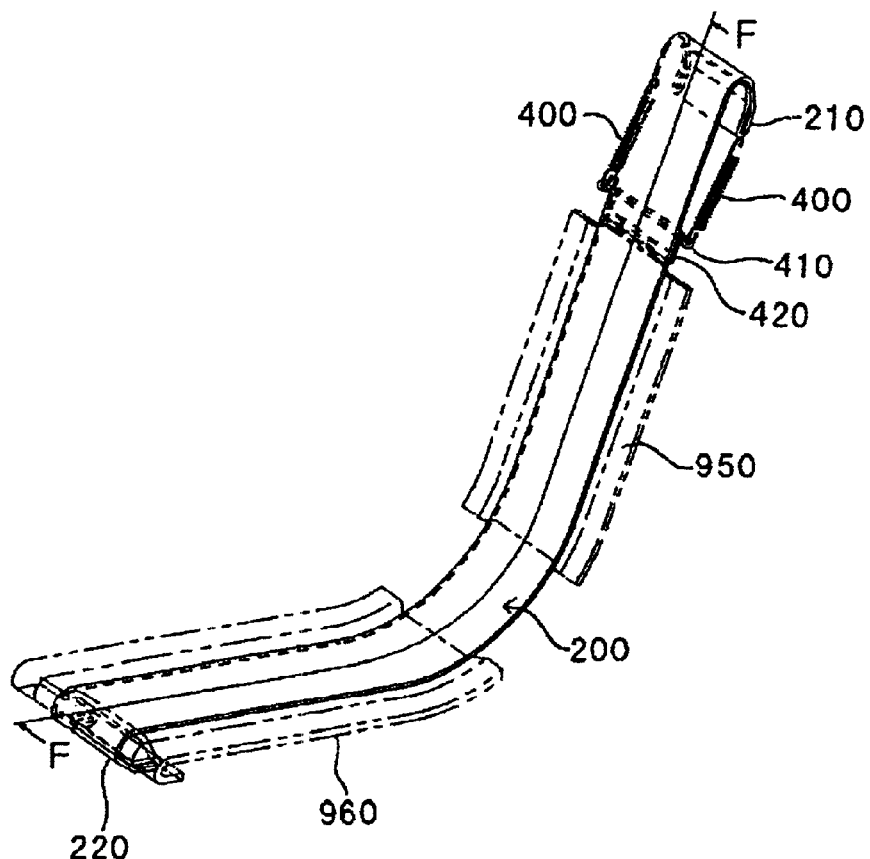
FIG. 18 is a perspective view partially showing a state to give a restoration property to the belt member using a metal spring.
Figure 19:
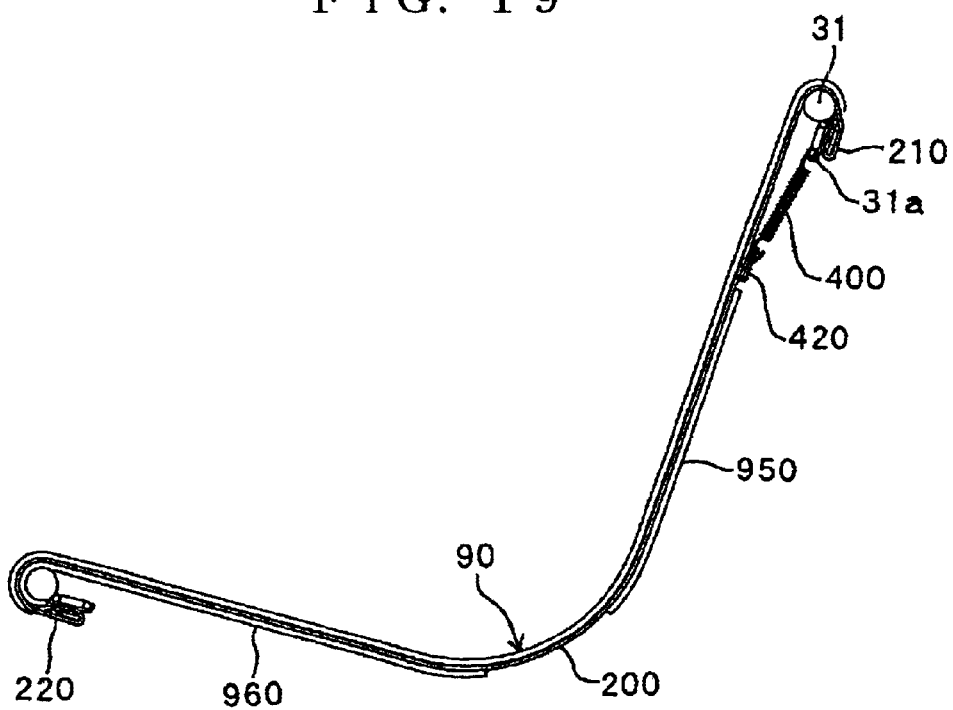
FIG. 19 is a sectional view taken along the line F—F in FIG. 18.
Figure 20:
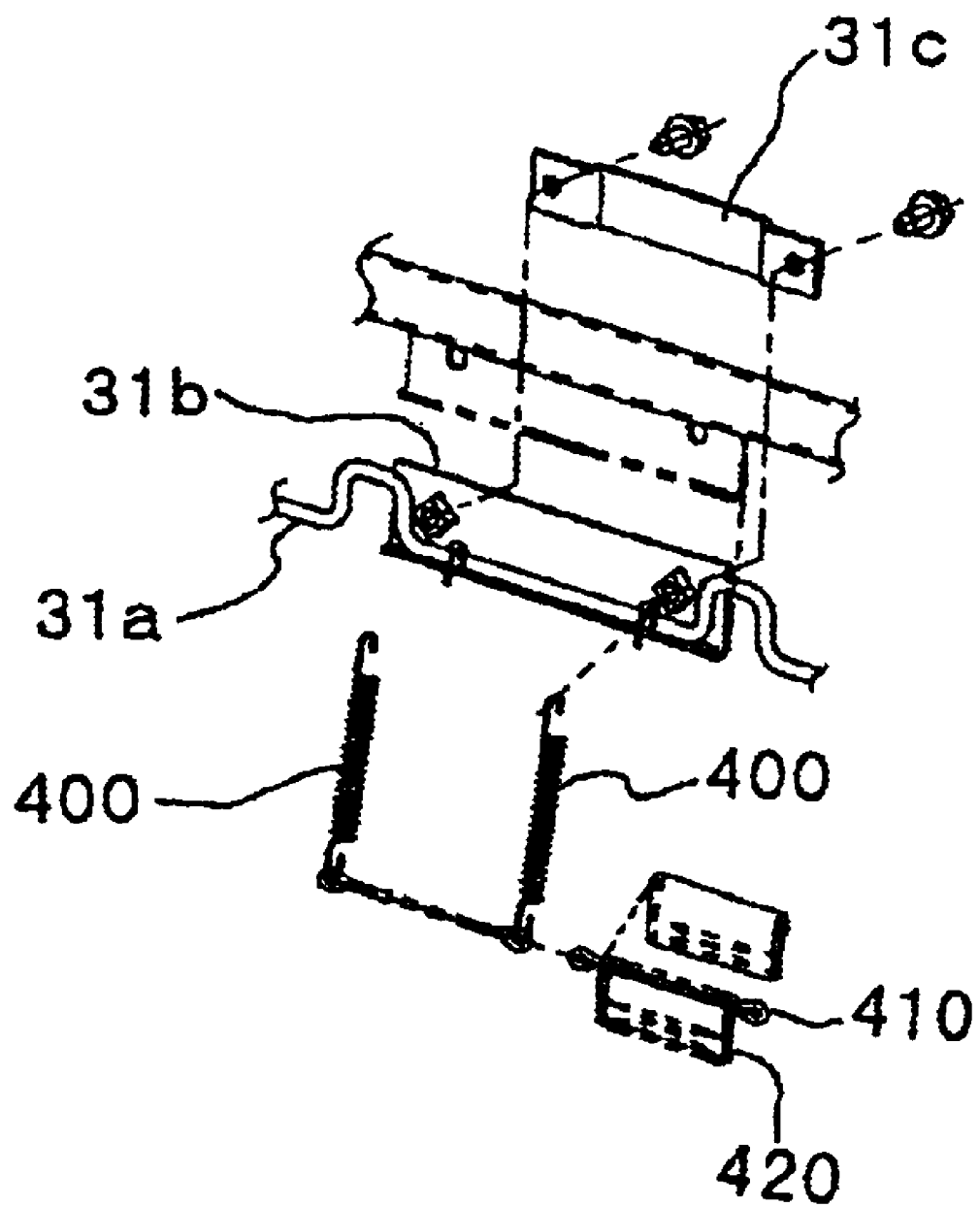
FIG. 20 is a view showing a fixed portion of the metal spring to an engaging wire.

Furthermore, it is also acceptable, as shown in FIG. 18 to FIG. 20 to attach a metal spring 400 between the halfway of the belt member 200 and the engaging wire 31a, in place of the above-described band member 300. Also in this case, it is possible to provide the restoration property to the belt member 200 by adjusting the elastic force of the metal spring 400 to enable the belt member 200 to be pulled up with the tensile strength of the metal spring 400. Incidentally, as shown in detail in FIG. 20, when an end of the metal spring 400 is connected to the halfway of the belt member 200, an engaging pin 410 is held in a manner to be wound around with a cloth member 420, the cloth member 420 is connected to the halfway of the belt member 200 by sewing or the like, and then the engaging pin 410 is engaged with an end of the metal spring 400. Thus the connection of the metal spring 400 with the halfway of the belt member 200 can be attained. Even if any of these above-described means may be adopted, the vibration absorption property of the seat can be improved when the belt member 200 is provided with such a restoration property as this.

Though the explanation is made taking a seat having a folding seat structure as an example for the seat in the above-described embodiment, it is needless to say that the present invention is applicable to a seat without a folding function so far as it is provided with the belt member having the waist-supporting function.

The seat of the present invention is provided with a belt member in the back side of each cushioning member, in which the belt member is held by engaging with an appropriate portion of the back frame at its one end and with an appropriate portion of the seat frame at the other end, disposed in the vicinity of at least either right or left side of a sitting person in a direction along the longitudinal cross-section, and designed to have the length in the overlapping area with the above-described cushioning members shorter than the length along an expanded state of the cushioning members in the same area and designed to be made of a material having a higher stiffness than those of respective cushioning members. By disposing the belt member, when a person takes a seat, it becomes possible to support the waist of the sitting person since a portion corresponding to the belt member is relatively bulged out. In addition, since a relatively bulged position of the place corresponding to the belt member differs in response to the physique (weight, etc.) of the sitting person, the waist-supporting function can be exhibited in response to difference in the physique so that the feeling of seating can be improved. Additionally, it can be attained only by disposing the belt member, thereby enabling to manufacture the seat having a simple structure at low cost.

Furthermore, the present invention enables even the seat for plural persons to be manufactured without disposing a frame member on a portion corresponding to the place between respective sitting persons at low cost, and enables to exhibit the waist-supporting function in response to difference in the physique so that the feeling of seating can be improved.

Still further, by taking a structure of the seat in which a distance between the inner sides of side frames composing the seat frame is arranged to be wider than a distance between the outer sides of side frames composing the back frame, and when the seat is folded, at least a portion of respective side frames of the back frame is surrounded by respective side frames of the seat frame so that the seat can be folded in a manner that the back frame is in the inside of the seat frame, the thickness of the seat cushion plus the seat back can be thinner than the conventional seat when it is folded so a space for baggage can be widened while having a structure to exhibit the waist-supporting function in response to difference in the physique.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A seat comprising:

a seat cushion having a cushioning member and a back face, said cushioning member being supported by a seat frame, said seat frame including a pair of side frames and a front end frame coupled to each of said side frames;

a seat back having a cushioning member and a back face, the cushioning member being supported by a back frame including a pair of side frames and a upper end frame coupled to each of said side frames, said back frame being coupled to said seat frame so that it is pivotable with respect to said seat frame; and a belt member having a first end and a second end, said belt member being adjacent to the back face of the cushioning member supported by said seat frame and the back face of the cushioning member supported by said back frame, said first end of said belt member being coupled to said back frame and said second end of said belt member being coupled to said seat frame, said belt member being positioned perpendicular to the front end frame and the upper end frame;

wherein a length of the belt member between the upper end frame and the front end frame is less than a length of the cushioning members between the upper end frame and the front end frame, said belt member being designed to be made of a material having a higher stiffness than those of each of the cushioning members; and wherein, a raised portion of each of the cushioning members is adapted to relatively rise where portion of each of the cushioning members are proximate to the belt member when a load of a sitting person is received by each of the said cushioning members, said raised portion serves as a waist-supporting mechanism for the sitting person.

2. The seat according to claim 1, wherein said first end of said belt member is held by engaging with the upper end frame of said back frame and said second end of the belt member is held by engaging with the front end frame of said seat frame.

3. The seat according to claim 1, wherein a covering member is fixed on the back face of each of said cushioning members to form a substantially cylindrical shape with said back face of each of said cushioning members, and said belt member is inserted in a hollow portion formed by the covering member.

4. The seat according to claim 1, wherein the cushioning member supported by said seat frame and the cushioning member supported by said back frame are made of a net member having a three-dimensional structure, said net member having a front mesh layer and a back mesh layer interconnected to each other by a large number of piles.

5. The seat according to claim 4, wherein said net member has a one-piece structure.

6. The seat according to claim 1, wherein said belt member is disposed between a first sitting person and a second sitting person.

7. The seat according to claim 1, wherein said seat cushion and said seat back are formed for a plurality of persons, and said belt member is positioned between the side frames of said back frame and between the side frames of said seat frame.

8. The seat according to claim 1, wherein said belt member includes a restoration property.

9. The seat according to claim 1, wherein a distance between each of the side frames of said seat frame is wider than a distance between each of the side frames of said back frame, and wherein said seat frame and said back frame are structured and arranged such that said back frame is surrounded by each of the side frames of said seat frame when said back frame is pivoted to said position when said back frame substantially overlies said seat frame.

* * * * *